(12) United States Patent
Mannikko (10) Patent No.: US 8,241,025 B2
(45) Date of Patent: Aug. 14, 2012

(54) APPARATUS FOR SCATTERING FIBROUS MATERIAL, E.G. CHIPS

(75) Inventor: Ari Mannikko, Nastola (FI)

(73) Assignee: Dieffenbacher Panelboard Oy, Nastola (FI)

( * ) Notice: Subject to any disclaimer, the term of this patent is extended or adjusted under 35 U.S.C. 154(b) by 506 days.

(21) Appl. No.: 12/517,522

(22) PCT Filed: Nov. 7, 2007

(86) PCT No.: PCT/FI2007/050596
§ 371 (c)(1),
(2), (4) Date: Jul. 31, 2009

(87) PCT Pub. No.: WO2008/068378
PCT Pub. Date: Jun. 12, 2008

(65) Prior Publication Data
US 2010/0003356 A1      Jan. 7, 2010

(30) Foreign Application Priority Data
Dec. 4, 2006   (FI) ..................... 20061067

(51) Int. Cl.
*B27N 3/14* (2006.01)
(52) U.S. Cl. .................................... 425/83.1
(58) Field of Classification Search ............... 425/81.1, 425/83.1; 198/382
See application file for complete search history.

(56) References Cited

U.S. PATENT DOCUMENTS

| | | | |
|---|---|---|---|
| 3,115,431 A * | 12/1963 | Stokes et al. | 264/113 |
| 3,202,743 A * | 8/1965 | Elmendorf | 264/109 |
| 3,807,931 A * | 4/1974 | Wood et al. | 425/449 |
| 4,058,201 A | 11/1977 | Etzold | |
| 4,315,722 A * | 2/1982 | Ufermann | 425/83.1 |
| 4,380,285 A * | 4/1983 | Burkner et al. | 198/533 |
| 4,494,919 A * | 1/1985 | Knudson et al. | 425/83.1 |
| 4,666,029 A | 5/1987 | Burkner | |
| 5,325,954 A | 7/1994 | Crittenden et al. | |
| 5,487,460 A * | 1/1996 | Barnes | 198/382 |
| 5,676,236 A * | 10/1997 | Barnes et al. | 198/382 |
| 6,276,511 B1 * | 8/2001 | Iredi et al. | 198/382 |
| 6,283,741 B1 | 9/2001 | Gustavsson et al. | |
| 6,695,605 B1 | 2/2004 | Wirthel et al. | |
| 6,752,256 B2 * | 6/2004 | Knudson | 198/382 |
| 7,004,300 B2 * | 2/2006 | Bossler | 198/382 |

FOREIGN PATENT DOCUMENTS

| | | |
|---|---|---|
| DE | 19846106 A1 | 4/2000 |
| DE | 19916447 A1 | 10/2000 |
| FI | 1-79968 | 8/1985 |
| FI | 956294 A | 12/1995 |
| FI | EP-1119447 A1 | 8/2001 |
| FI | EP-1171269 A1 | 1/2002 |

* cited by examiner

*Primary Examiner* — James Mackey
(74) *Attorney, Agent, or Firm* — Birch, Stewart, Kolasch & Birch, LLP (57) ABSTRACT

An apparatus for scattering fibrous material, e.g., chips, the apparatus serving to spread chips using either a throw or air-jet spreading method to form a mat (3) of chips onto a moving band conveyor (4) or the like, whereby the scattering process avails a gas flow, such as air flow, for instance. The apparatus includes a scattering chamber mounted above the band conveyor or the like. In order to prevent lateral turbulence, the volume of the scattering chamber's length wherein the major portion of the material being scattered falls onto the band conveyor or the like is at least partially divided into smaller subspaces adjacent to each other in the cross-machine direction by substantially thin plate-like elements (9) set apart from each other in a cross-machine direction at a spacing substantially larger than the particle size of the material being scattered.

20 Claims, 8 Drawing Sheets

APPARATUS FOR SCATTERING FIBROUS MATERIAL, E.G. CHIPS

CROSS-REFERENCE TO RELATED APPLICATIONS

The present application is a National Phase application claiming priority under 35 USC 371 to PCT/FI2007/050596 filed on Nov. 7, 2007 and Finish Application No. 20061067 filed on Dec. 4, 2006 the entire contents of which are hereby incorporated by reference.

BACKGROUND OF THE INVENTION

1. Field of the Invention

The present invention relates to an apparatus for scattering fibrous material, e.g., chips, said apparatus serving to spread chips using either a throw or air jet spreading method to form a mat of chips onto a moving band conveyor or the like, whereby the scattering process avails a gas flow, such as air flow, for instance; the apparatus having a scattering chamber mounted above the band conveyor or the like.

2. Description of Background Art

Scattering chips by rollers is basically known from patent publication FI-90746, wherein an apparatus is disclosed for spreading fibers or chips together with a binder into a mat onto a forming band conveyor, said apparatus comprising one array of rollers comprising at least three mutually parallel rollers, whereby the interroller spacings are adapted adjustable. An air flow is adapted to pass between the roller array and the band conveyor by means of air suction or using a combination air blow and suction.

From patent publication FI-20040698 is known a method and apparatus using the same for scattering chips with a binder into a mat of particles onto a band conveyor, in which apparatus the chips are scattered by passing them through one or more roller arrays and simultaneously a gas flow is employed wherein the gas is, e.g., air and the gas flow is passed into at least two substantially chamber-like spaces situated above and below said at least one roller array and in which at least one chamber-like space has the gas flow directed opposite to the gas flow direction in the other chamber-like spaces.

As compared to air-jet spreading, roller scattering is characterized by a good accuracy of scattering (i.e., small variations of basis weight of the mat) inasmuch as the classification of the chips is chiefly performed mechanically by means of the roller array rather than with the help of an air flow as in air-jet spreading. In air-jet spreading, the control of air flow patterns is particularly problematic. The air flow readily tends to become excessively turbulent thus degrading the accuracy of scattering (hence, the quality of scattering), because strong turbulence deviates the chip particles in an uncontrollable fashion, particularly in the cross direction of the particle mat.

In prior-art roller scattering constructions, it has been possible to keep the free gravity fall of chips in the chamber enclosing the roller array and the band conveyor advantageously very small (typically 300 mm, for instance). Air suction has been necessary only under the chamber. The velocity of the suction air flow has been maintained reasonably low (typically below 1 m/s). Due to the shallow structure of the chamber and the relatively small volumetric rate of air flow adapted to pass below the roller array has remained at an advantageously low level. As a result, the turbulence occurring in the air flows and hence tending to degrade the accuracy of scattering has been kept sufficiently low, whereby the accuracy of scattering has been good.

Today, the surface quality of particle board must fulfill increasingly higher specifications in certain surface treatment applications (particularly those aiming to cut costs). One such application is so-called "direct printing" wherein onto the surface of the board that is pretreated with a thin primer layer is printed, e.g., a wood grain imitation pattern directly using a multicolor printing method. In order to reduce product costs, the coat layers or paint layers applied onto particle boards are today preferably made thinner than previously. Board types suited for such coat application must have an extremely dense surface texture and be comprised of particles so fine that all the chips can typically pass through screen openings of, e.g., 1 mm square and, furthermore, of this chips typically 70%, for instance, can pass screen openings of 0.5 mm square. A particularly critical requirement is that such particles to spread must be sufficiently thin, e.g., max. 0.3 mm thick. The demand for chip thinness is in turn linked thereto that a particle possibly detached from the board surface during sanding or, e.g., edge trimming, may not leave an excessively deep dent that later could become visible as, e.g., a surface defect after the application of a thin coat or as a disturbing ragged edge after trimming a coated board by a saw. A thin chip that advantageously has a leaf- or fiber-like shape also reduces the porosity of the board surface thus, e.g., cutting down paint consumption during coating and improving the strength of the glue-to-chip bond, whereby the separation of chips is diminished. Conversely, a thick chip having, e.g., a cubical shape is inferior in this respect.

The irregular turbulence of air flows that degrades the accuracy of scattering is accentuated in conventional spreading by air jets which requires relatively high air plenums (typically higher than 2 m) together with air flow velocities typically faster than those employed in roller array scattering, and further, particularly, the use of active blowing at the feed end of chips in order to attain sufficient classification. Generally, the air-jet plenums must also be complemented with screens serving to damp turbulence of air flow. Such screens are clumsy to use, cause extra costs and are readily plugged as they must be placed in a dusty space. Due to dust generation by the active air jet blowing, the maintenance need of an air-jet spreading system is extensive as compared with roller array scattering. The production line must be stopped frequently for cleaning the air-jet nozzles and screens in order to restore the scattering accuracy to a reasonably good level.

To fulfill the earlier discussed requirement of using thin chips, the drop height of chips in roller array scattering must be increased case-by-case so much that a sufficiently large fraction of thin chips can be classified apart and, at the right moment, caused to drop onto a desired area of the particle mat. Increasing the scattering chamber height, however, promotes the turbulence of the air flow being sucked/blown into the chamber, whereby the accuracy of scattering is degraded.

In FI Pat. Appl. 20060437 a roller array scattering apparatus is disclosed, wherein an attempt is made to improve the accuracy of scattering with the help of an element which is placed in front of the air inlet opening located at the exit end of the roller array in the travel direction of the wood chips in order to homogenize the air inlet flow pattern. The flow-homogenizing element comprises, e.g., a drilled plate, screen, honeycomb structure or a tangential blower or the like capable of producing a substantially laminar air flow pattern, or a combination of any of these. Such an arrangement has been found to reduce lateral turbulence, particularly in the vicinity of the flow-homogenizing element. However, its effect cannot be extended over the entire volume of the scattering chamber, but instead, the transverse turbulence more remotely from the homogenizing element increases in a disturbing fashion.

Figure 12:
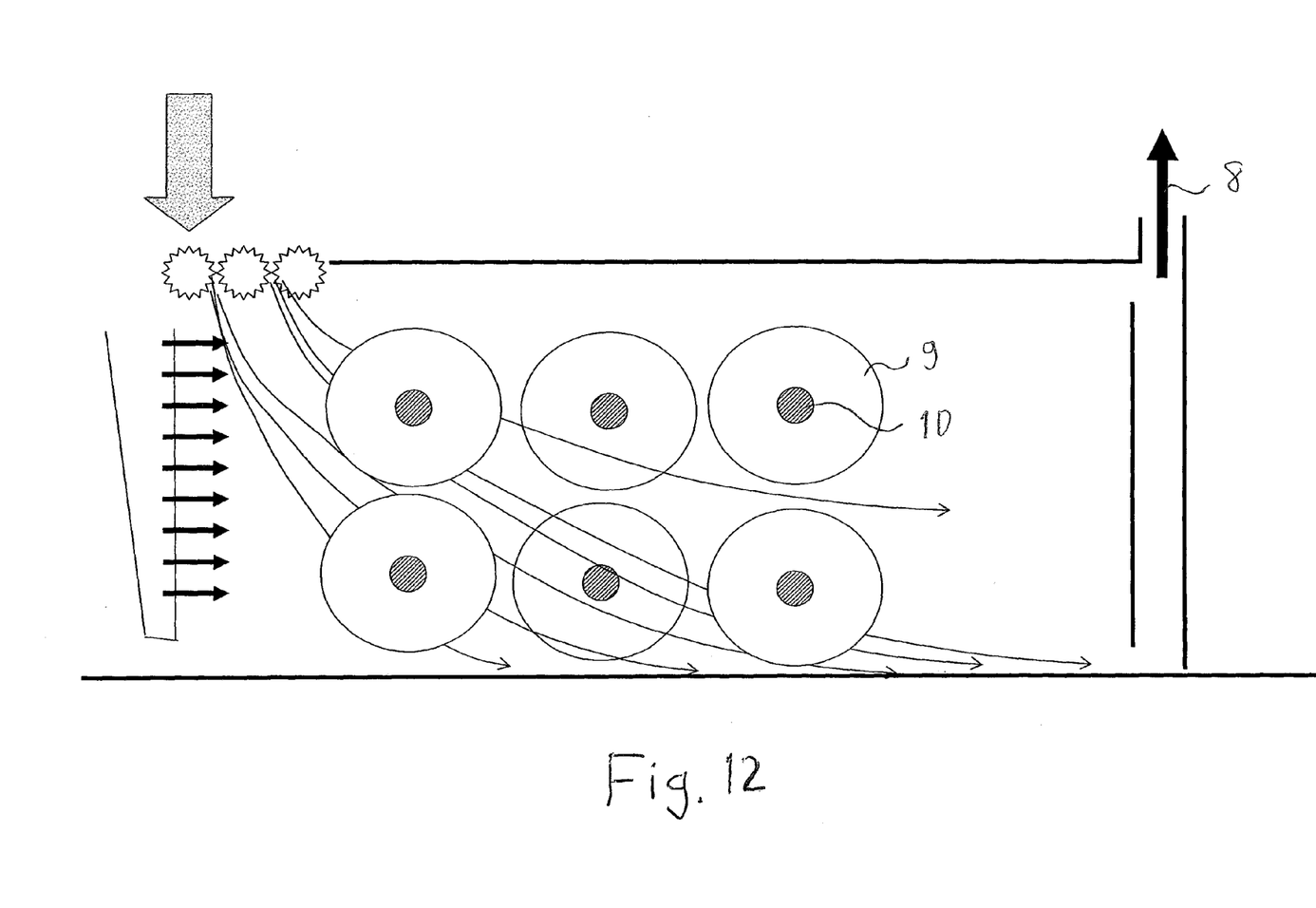
Figure 13:
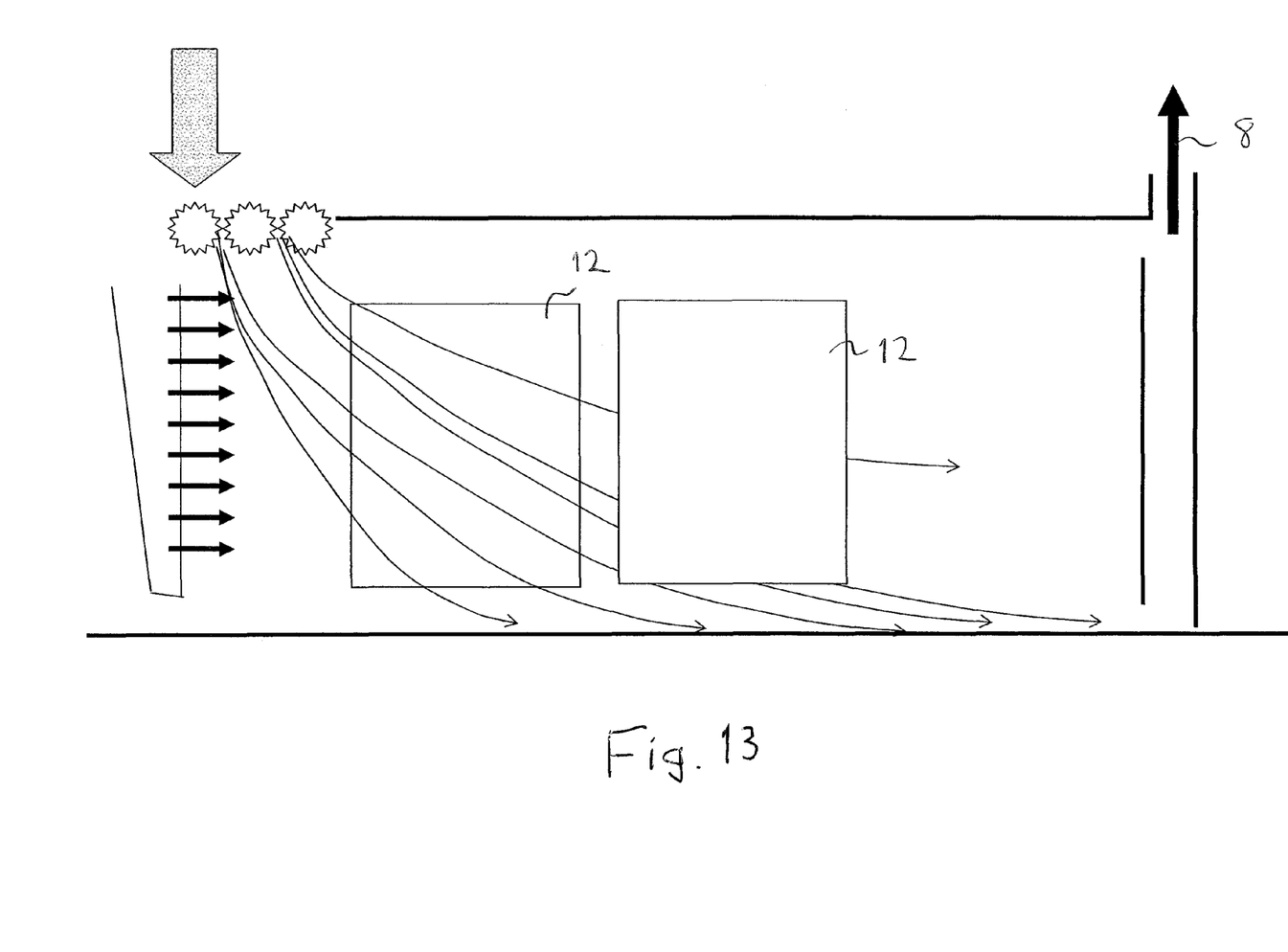

For use in air-jet spreading systems are known air blow diffusers having in the close vicinity of the diffuser outlet mounted short, parallel guide vanes with a height substantially equal to that of the diffuser and aligned vertically in the travel direction of the forming line, whereby the vanes orient the air flow being blown into the scattering chamber. The homogenizing effect of such guide vanes, however, does not extend to the actual working space of the scattering chamber where a major portion of the particulate material being spread falls onto the conveyor thus forming a mat.

In summary it can be said that the scattering chamber height is preferably maximized to improve the classification of particles. However, a higher scattering chamber invokes detrimental lateral turbulence, whereby the cross-machine profile of the particle mat cannot be made sufficiently homogeneous due to the uncontrolled landing of the particles onto the conveyor across its cross-machine width. Turbulence is primarily invoked by the impingement of the air flow on the material flow. Obviously, turbulence increases when the scattering chamber is made higher and the air flow velocity is increased.

SUMMARY AND OBJECTS OF THE INVENTION

It is an object of the invention to provide an apparatus wherein the amount of turbulence, particularly lateral turbulence, can be substantially reduced over the entire volume of the scattering chamber. The problems are solved by virtue of the present invention characterized in that, to prevent lateral turbulence, the volume of the scattering chamber's length wherein the major portion of the material being scattered falls onto the band conveyor or the like is at least partially divided into smaller subspaces adjacent to each other in the cross-machine direction by substantially thin plate-like elements set apart from each other in cross-machine direction at a spacing substantially larger than the particle size of the material being scattered.

A preferred embodiment of the apparatus according to the invention is characterized in that the substantially thin plate-like elements have a length substantially equal to that of the scattering chamber and a height extending over a portion of the scattering chamber height.

Another preferred embodiment of the apparatus according to the invention is characterized in that in the longitudinal direction of the scattering chamber are adapted a plurality of shorter plates in succession and in parallel so aligned as to run substantially in vertical planes in the longitudinal direction of the chamber.

A still another preferred embodiment of the apparatus according to the invention is characterized in that in the longitudinal direction of the scattering chamber are adapted a plurality of shorter plates in succession and in parallel so aligned as to be substantially staggered in their vertical planes in the longitudinal direction of the chamber.

Division of the scattering chamber in its longitudinal direction into plural narrow subspaces prevents the detrimental cross-machine turbulence.

As a result, particles can fall freely down but cannot deviate during the fall in the lateral direction, whereby the density profile of the particle mat in the cross-machine direction obviously becomes more homogeneous than in prior-art systems. Due to the extreme thinness of the compartmentalizing plates/discs, they will not cause lateral deviation of the chips in scattering.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows an apparatus for scattering chips having the scattering chamber equipped with an assembly according to the invention;

FIG. 2 shows the apparatus of FIG. 1 in a sectional view taken along line A-A;

FIG. 3 shows the apparatus of FIG. 1, now having the scattering chamber equipped with an assembly according to an alternative embodiment of the invention;

FIG. 4 shows the apparatus of FIG. 3 in a sectional view taken along line B-B;

FIG. 5 shows the apparatus of FIG. 1, now having the scattering chamber equipped with an assembly according to another alternative embodiment of the invention;

FIG. 6 shows the apparatus of FIG. 5 in a sectional view taken along line C-C;

FIG. 7 shows the apparatus of FIG. 1, now having the scattering chamber equipped with an assembly according to still another alternative embodiment of the invention;

FIG. 8 shows the apparatus of FIG. 7 in a sectional view taken along line D-D;

FIG. 9 shows a still another embodiment of the apparatus of FIG. 7 in a sectional view taken along line D-D;

FIG. 10 shows an alternative embodiment of the invention;

FIG. 11 shows an embodiment of the invention having an air-jet spreading device according to FI Pat. Appl. 20060437 added thereto;

FIG. 12 shows an air-jet spreading chamber equipped with turbulence-reducing elements; and FIG. 13 shows and air-jet spreading chamber having turbulence-reducing elements according to an alternative embodiment of the invention adapted thereto.

DETAILED DESCRIPTION OF THE PREFERRED EMBODIMENTS

Accordingly, in FIG. 1 is shown an apparatus for scattering chips by way of using a roller array 1 for scattering while the classification of chips is enhanced by air flow. The air flow can be implemented by suction and/or blowing. One such scattering roller array is disclosed in FI Pat. No. 90746. The chips are fed from the scattering chamber 2 in a conventional fashion onto the roller array 1, wherefrom the chips fall onto a band conveyor 4 so as to form a particle mat 3. The travel direction of the band conveyor is denoted by an arrow. Between the band conveyor 4 and the roller array 1 is situated a volume called scattering space. It must however be noted that the scattering space discussed in this invention may as well be situated, e.g., between two roller arrays or does not necessarily need a roller array at all. An example of such scattering space is formed in an air-jet spreading chamber (FIGS. 12 and 13).

Figures 1, 2:
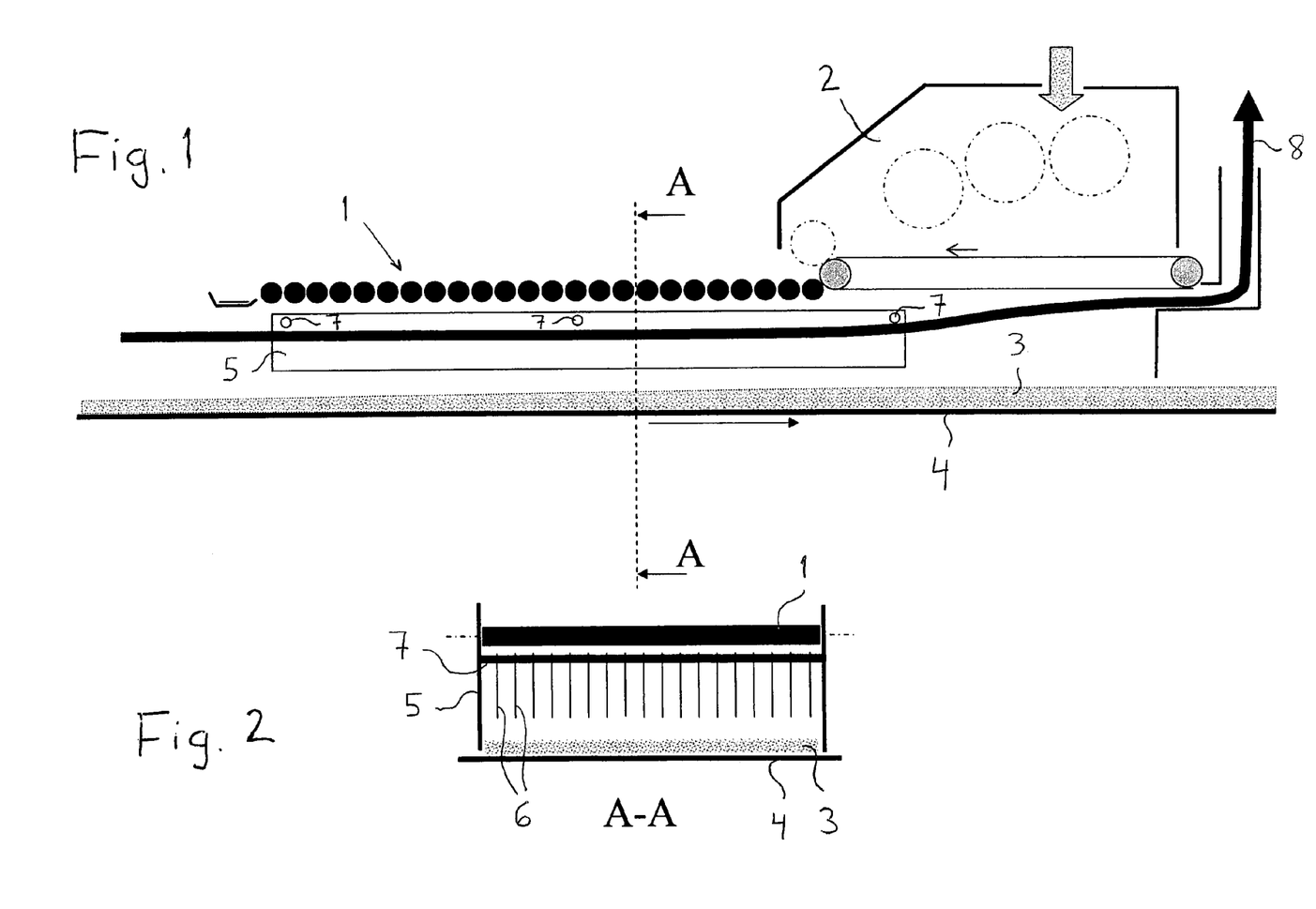

Below the roller array in the scattering chamber is adapted an apparatus 5 according to the invention for preventing turbulence, particularly lateral turbulence, in the info wing air and particulate material being scattered. From the sectional view of FIG. 2 can be seen that the scattering space is divided in its longitudinal direction (airflow direction) into plural smaller subspaces. To this end, the apparatus is provided with thin, plate-like, elongated elements 6 attached to transverse bars 7. The thickness of the plate-like elements 6 can be in the order of 1 mm, for instance. The plate elements prevent drift of the air flow and chips in the lateral direction, whereby the chips fall smoothly so as to form a homogeneous particle mat 3. In FIG. 1 the air flow through the scattering chamber is indicated by a thick arrow 8.

Figure 3:
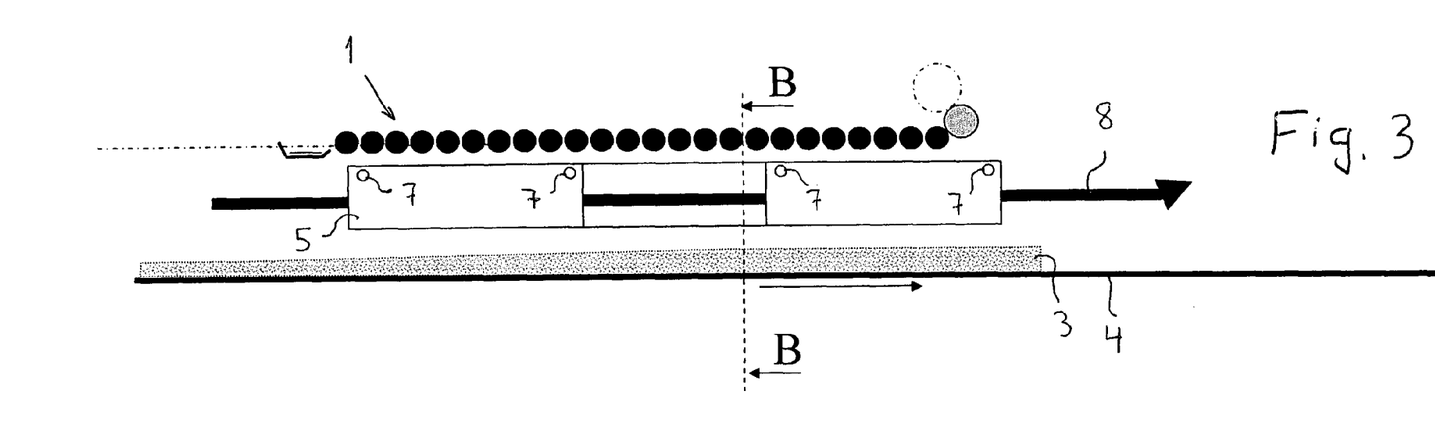
Figure 4:
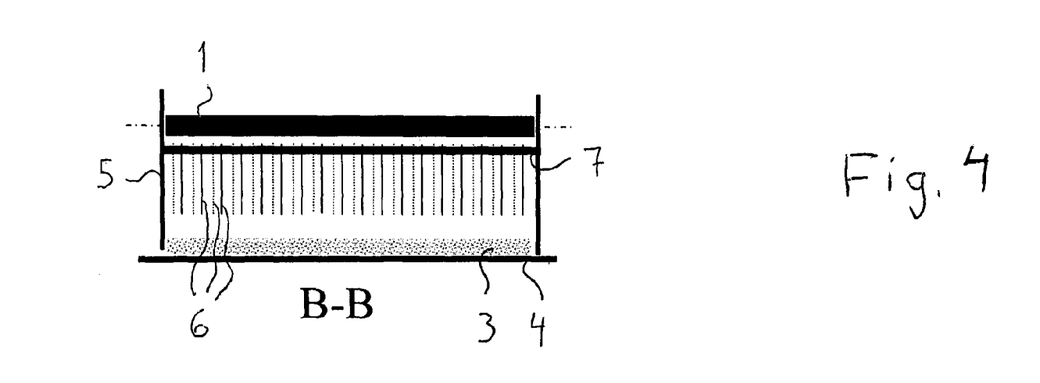

In FIGS. 3 and 4 is shown an apparatus 5 for dividing the scattering space in its longitudinal direction into plural subspaces, whereby in this apparatus the thin plate-like elements do not have a length extending over the entire length of the scattering space, but instead, are made shorter with a length of about ⅓ of the chamber length in the illustrated embodiment. In the longitudinal direction, these plate elements of a given longitudinal vane are staggered so that the plate in the center position is laterally shifted in regard with the preceding and succeeding plate. The purpose of the longitudinally staggered disposition is to avoid the formation of tracks on the laid mat of particulate material. To clarify that the actual path of the air flow is now meandering instead of the having a straight path as in the earlier described embodiment, arrow 8 is drawn in an intermitted fashion.

Figure 5:
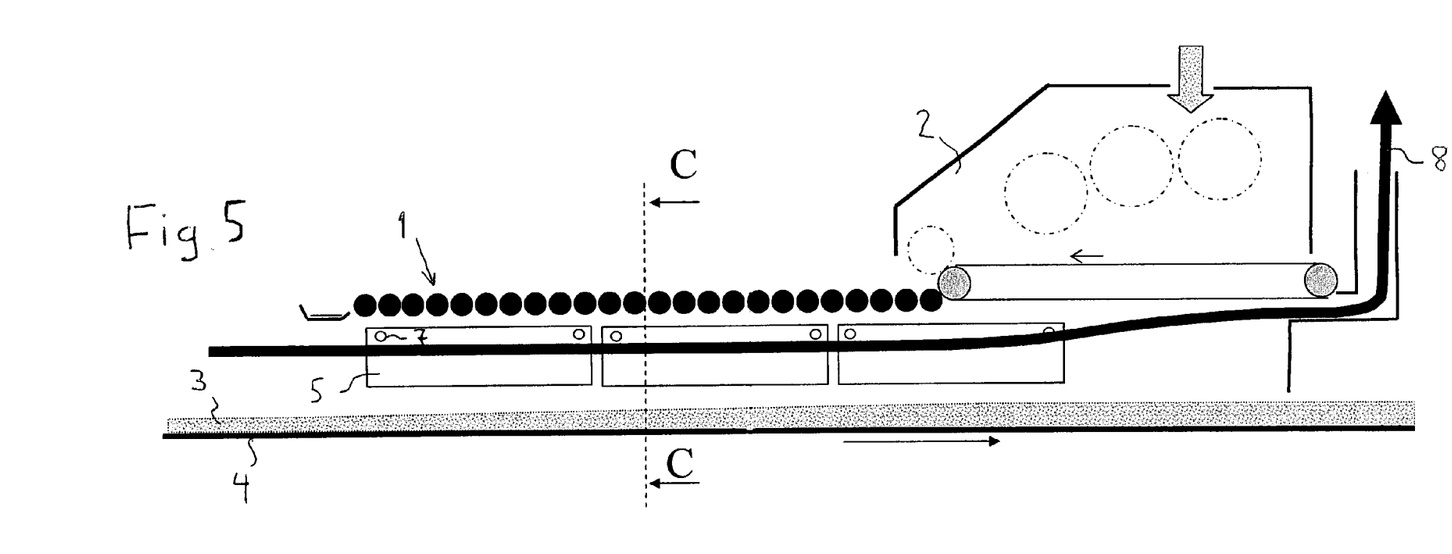
Figure 6:
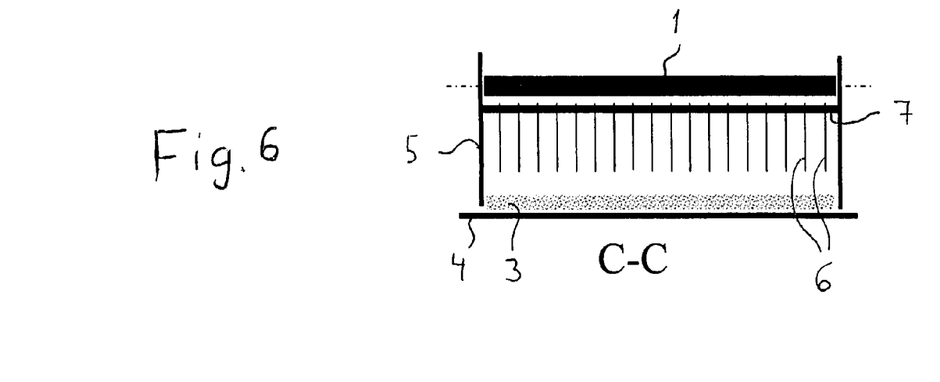

In FIGS. 5 and 6 is shown an embodiment similar to that of FIGS. 3 and 4, the only difference being in the placement of the plate-like elements of a longitudinal vane that are here aligned in line thus allowing the air flow (arrow 8) to travel directly.

Figure 7:
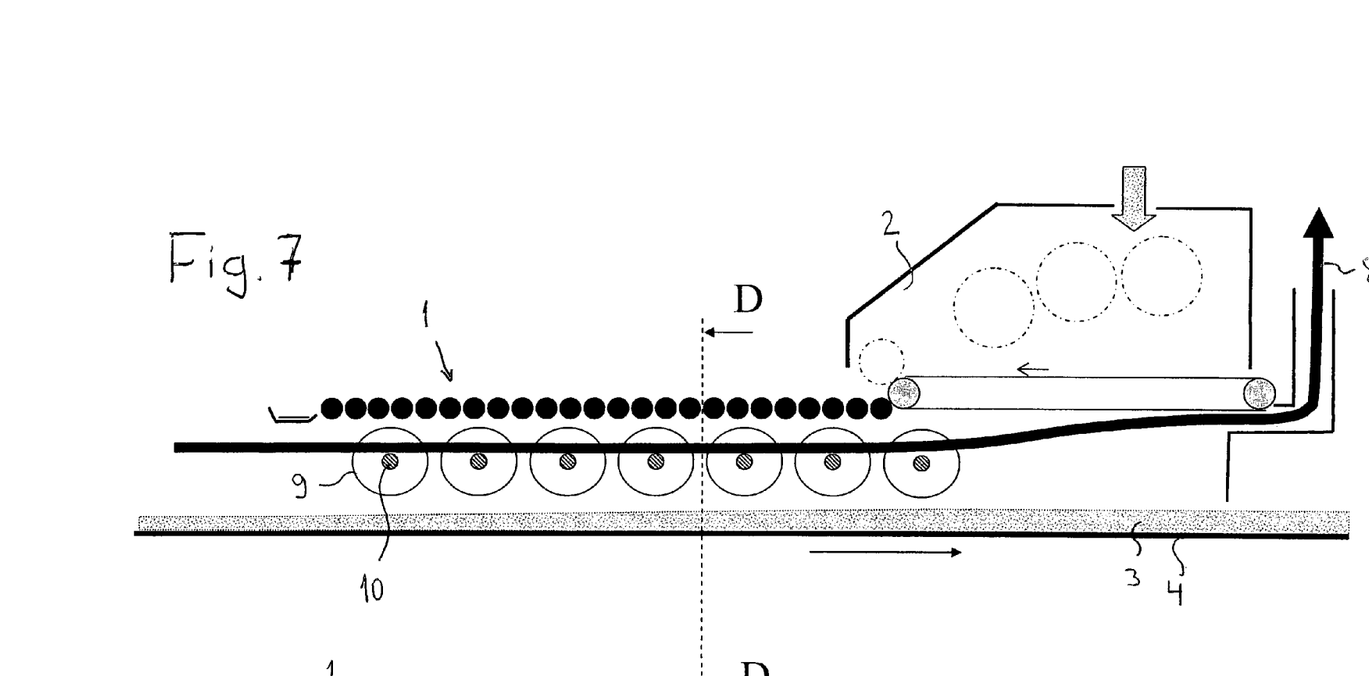

In FIG. 7 is shown an apparatus having a construction different from those described above. Lateral turbulence in the scattering space of this embodiment is prevented with the help of thin disc-like elements 9 by means of which the scattering space is divided in its longitudinal direction into narrower subspaces. The discs 9 are mounted on shafts 10 substantially equispaced in the cross-machine direction of the scattering space. In the longitudinal direction of the scattering space, the shafts are also substantially equispaced. In FIG. 7 is shown an embodiment wherein the discs mounted on the successive shafts are spaced tightly close to each other thus allowing a simple removal of a shaft during maintenance.

Figure 8:
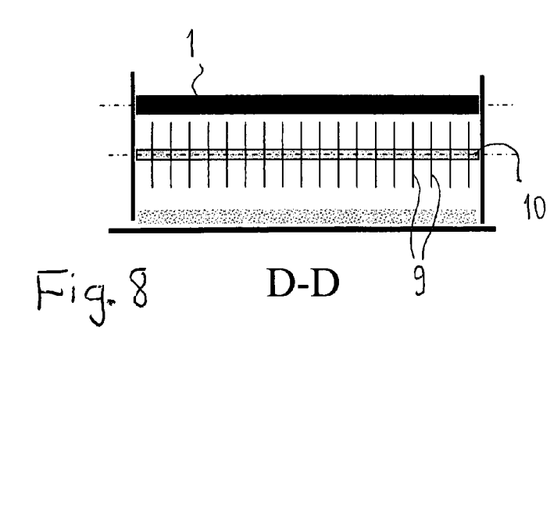
Figure 9:
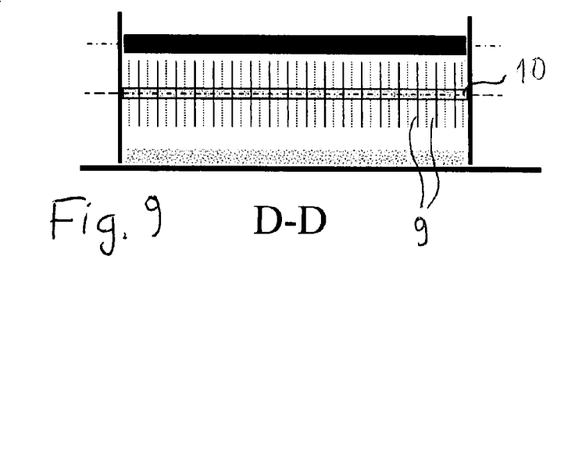

In FIGS. 8 and 9 are shown sectional views of alternative embodiments taken along line D-D in FIG. 7. In FIG. 8 the discs are shown aligned in line, whereby the longitudinal air flow channels of the scattering space are straight in a top view. In FIG. 9 respectively is shown an embodiment having the discs 9 mounted on the successive shafts laterally stairwise staggered, whereby the longitudinal air flow channels become meandering in lieu of being straight.

The discs 9 are advantageously made very thin with a thickness of about 1 mm, whereby they cannot interfere with outcome of scattering. Should the discs be made thicker, the density of the particle mat forming right below them would become different from the average thickness of the mat. The mutual spacing of discs 9 is set substantially wider than the largest dimension of the scattered chips, whereby the discs cannot essentially affect the alignment of the particles landing on the mat.

Figure 10:
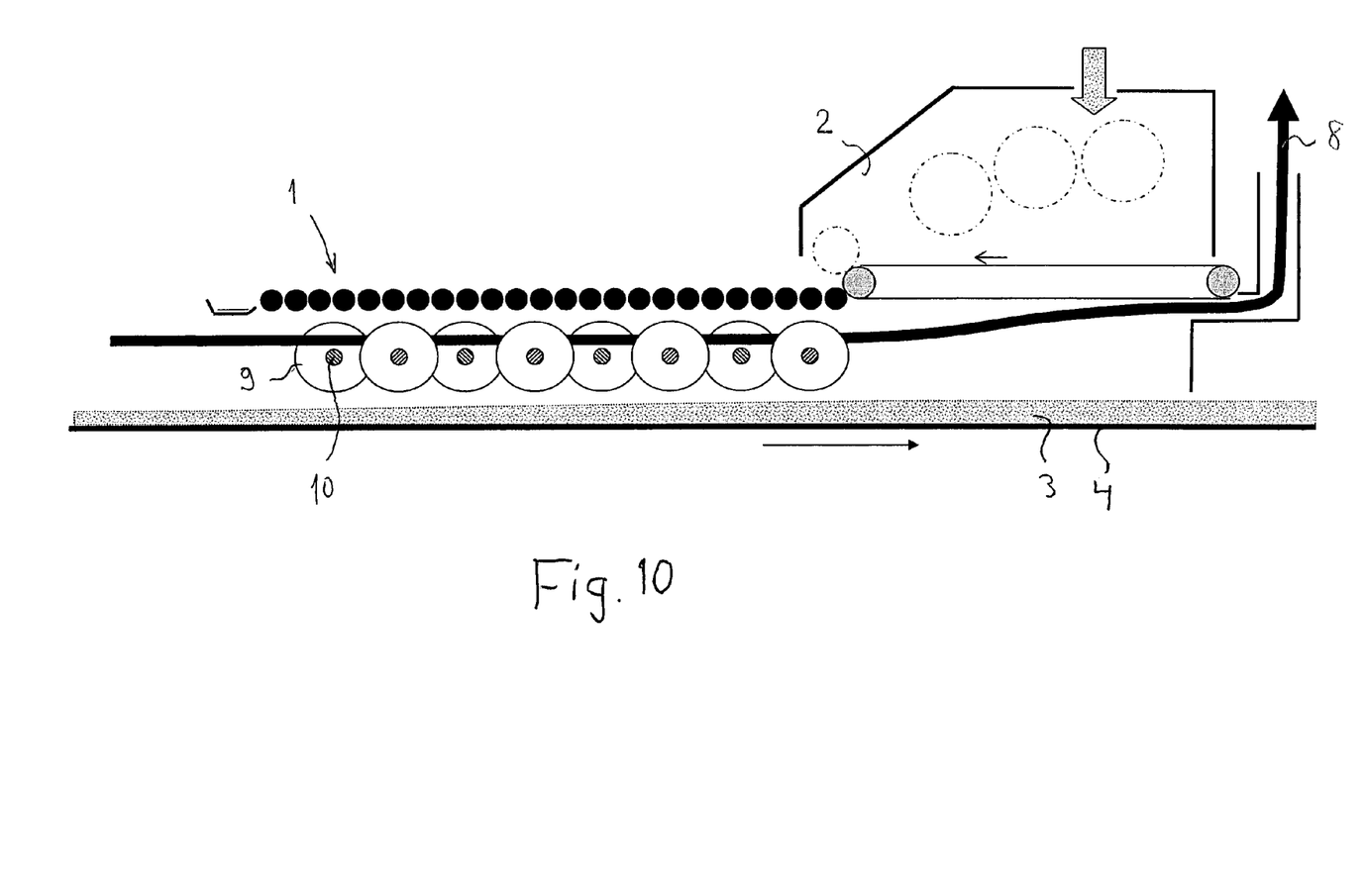

In FIG. 10 is shown an embodiment having the discs aligned not only in a staggered fashion but also in a partially interdigitated. In other details this construction is similar to that shown in FIGS. 7-9.

Figure 11:
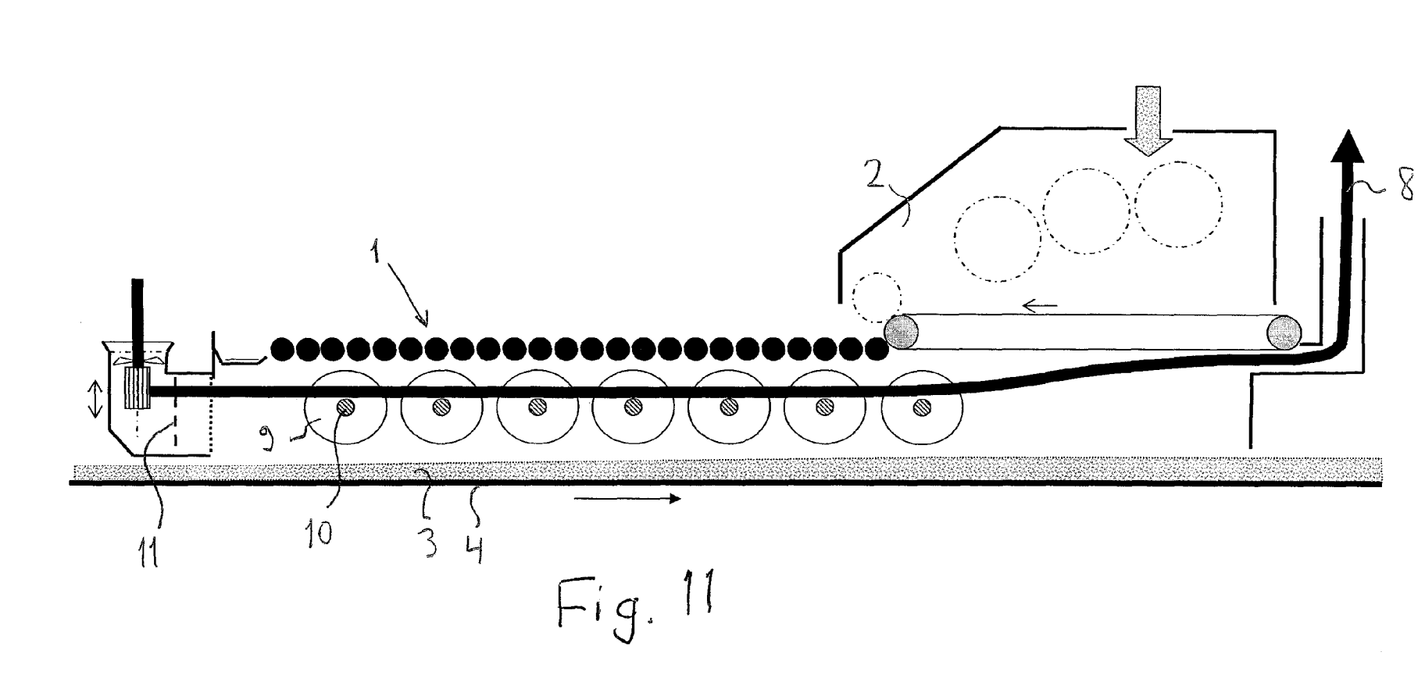

In FIG. 11 is shown an embodiment similar to that of FIG. 7, now complemented in the space between conveyor 4 and roller array 1 at the exit end of roller array 1 with a flow-homogenizing element 11 disclosed in FI Pat. Appl. 2006 0437 additionally having air blow adapted thereto.

In FIG. 12 is shown an embodiment having the invention adapted to air-jet spreading alone. Into the air-jet spreading chamber are placed shafts 10 with discs 9 mounted thereon, advantageously across the entire width of the air-jet spreading chamber. The number of shafts and discs can be varied freely as required in a particular application. Also their placement in the air-jet spreading chamber may be varied.

In FIG. 13 is shown an alternative embodiment for use in an air-jet spreading chamber. Therein the apparatus preventing lateral turbulence comprises plate-like elements 12 whose number and placement may be implemented in a fashion suited for a particular application.

The elements serving to prevent lateral turbulence must obviously be kept sufficiently clean to avoid formation of undesirable clump that may fall onto the mat of particles and like disturbances. Cleaning the elements may be arranged, e.g., by complementing the elements with a vibrator or making them otherwise actuatable. For instance, the discs 9 can be made rotatable. Additionally, separate cleaning means may be adapted to the apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for scattering fibrous material chips, said apparatus serving to spread chips using either a throw or air-jet spreading method to form a mat (3) of chips onto a moving band conveyor (4), whereby a scattering process utilizes a gas flow, the apparatus comprising:

a scattering chamber mounted above the band conveyor to prevent lateral turbulence, said scattering chamber having a predetermined volume defined by a height, a width and a length extending in a longitudinal direction wherein a major portion of the fibrous material being scattered falls onto the band conveyor and the fibrous material is at least partially divided into smaller subspaces adjacent to each other in a cross-machine direction by plate elements (6, 9, 12) extending in the longitudinal direction and set apart from each other in the cross-machine direction at a spacing substantially larger than the particle size of the material being scattered, said plate elements being spaced above the moving band conveyor within said scattering chamber a predetermined distance to avoid contact with the mat of chips formed on the moving band conveyor.

2. The apparatus of claim 1, wherein said plate elements (6) have a length substantially equal to that of the scattering chamber and a height extending over a portion of the scattering chamber height.

3. The apparatus of claim 1, wherein in the longitudinal direction of the scattering chamber a plurality of plates (6) in succession and in parallel are aligned to run essentially in vertical planes in the longitudinal direction of the scattering chamber.

4. The apparatus of claim 1, wherein in the longitudinal direction of the scattering chamber a plurality of plates (6) are aligned and substantially staggered in their vertical planes in the longitudinal direction of the chamber.

5. The apparatus of claim 1, wherein the plate elements are discs (9).

6. The apparatus of claim 5, wherein the discs (9) are mounted in the scattering chamber onto a transverse shaft (10) in a substantially equispaced fashion.

7. The apparatus of claim 6, wherein a plurality of shafts (10) are adapted in succession in the scattering chamber whereby each shaft has substantially an equal number of discs (9) mounted thereon and that the discs are aligned substantially in line relative to the corresponding discs of the adjacent shaft.

8. The apparatus of claim 6, wherein a plurality of shafts (10) are adapted in succession in the scattering chamber whereby each shaft has substantially an equal number of discs (9) mounted thereon and the discs are aligned in a stairwise staggered fashion relative to the corresponding discs of the adjacent shaft.

9. The apparatus of claim 8, wherein the discs (9) of adjacent shafts (10) are mounted at least partially in an interdigitated fashion.

10. The apparatus of claim 6, wherein the thickness of the discs (9) mounted on the shaft (10) is about 1 mm and interdisc spacing is set substantially wider than the largest dimension of the scattered chips.

11. The apparatus of claim 6, wherein the shafts (10) with the discs (9) mounted thereon are adapted rotatable for aiding the cleanliness thereof.

12. The apparatus of claim 1, wherein the plate elements (6, 9, 12) are adapted laterally reciprocatingly movable in the cross-machine direction relative to a travel direction of the particle mat in order to prevent the elements from causing irregularities on the profile of the mat and/or to aid the cleanliness of the elements.

13. The apparatus of claim 1, wherein the plate elements (6, 9, 12) are adapted vibratable in a continuous or intermittent fashion to aid the cleanliness of the elements.

14. The apparatus of claim 7, wherein the thickness of the discs (9) mounted on each of the plurality of shafts the shaft (10) is about 1 mm and interdisc spacing is set substantially wider than the largest dimension of the scattered chips.

15. The apparatus of claim 8, wherein the thickness of the discs (9) mounted on each of the plurality of shafts (10) is about 1 mm and interdisc spacing is set substantially wider than the largest dimension of the scattered chips.

16. The apparatus of claim 9, wherein the thickness of the discs (9) mounted on each of the plurality of shafts (10) is about 1 mm and interdisc spacing is set substantially wider than the largest dimension of the scattered chips.

17. The apparatus of claim 7, wherein the shafts (10) with the discs (9) mounted thereon are adapted rotatable for aiding the cleanliness thereof.

18. The apparatus of claim 8, wherein the shafts (10) with the discs (9) mounted thereon are adapted rotatable for aiding the cleanliness thereof.

19. The apparatus of claim 9, wherein the shafts (10) with the discs (9) mounted thereon are adapted rotatable for aiding the cleanliness thereof.

20. The apparatus of claim 10, wherein the shafts (10) with the discs (9) mounted thereon are adapted rotatable for aiding the cleanliness thereof.

* * * * *